United States Patent [19]

Handel

[11] Patent Number: 5,278,823
[45] Date of Patent: Jan. 11, 1994

[54] METHOD AND APPARATUS FOR PERMITTING INTRANEWORK TESTING OF INTERNETWORK FUNCTIONS

[75] Inventor: John M. Handel, Plainfield, Ill.

[73] Assignee: AT&T Bell Laboratories, Murray Hill, N.J.

[21] Appl. No.: 858,478

[22] Filed: Mar. 27, 1992

[51] Int. Cl.⁵ ............................ H04J 1/16; H04J 3/14
[52] U.S. Cl. .................... 370/13; 370/85.13; 370/85.14; 340/825.05; 371/11.2
[58] Field of Search ............... 370/94.1, 85.13, 85.14, 370/13, 17, 110.1, 119, 15, 13.1, 60.1, 58.1; 340/825.01, 827, 825.16, 825.05; 371/11.2, 20.4-6

[56] References Cited

U.S. PATENT DOCUMENTS

| | | | |
|---|---|---|---|
| 4,419,751 | 12/1983 | Cholat-Namy et al. | 370/17 |
| 4,592,048 | 5/1986 | Beckner et al. | 370/60 |
| 4,751,510 | 6/1988 | de Saint Michel et al. | 370/17 |
| 4,984,233 | 1/1991 | Nakayashiki et al. | 370/94.1 |
| 4,998,240 | 3/1991 | Williams | 370/17 |
| 5,027,343 | 6/1991 | Chan et al. | 370/17 |

OTHER PUBLICATIONS

AT&T Technical Journal, Jul.-Aug. 1985, vol. 64, No. 6, Part 2, pp. 1305-1333, Introduction—K. M. Martersteck et al., "Applications Planning" W. R. Byrne et al. AT&T Technical Journal, Summer, 1991, vol. 70, Nos. 3-4, "Intelligent Network Directions", G. Y. Wyatt et al., pp. 1-10.
AT&T Technical Journal, Summer, 1991, vol. 70, Nos. 3-4, "Intelligent Network Platforms in the U.S.", E. G. Russo et al., pp. 26-33.
CCITT, vol. VI—Fascicle VI.7., "Specifications of Signalling System No. 7, Recommendations Q.700-Q.716", Geneva, 1989, pp. 3, 8-11, 18-21, 127-129, 408-411, 441-449.
Applied Data Communications Handbook, J. L. Douglass, Universal Data Systems, 1984, pp. 288-292.

Primary Examiner—Douglas W. Olms
Assistant Examiner—Chau T. Nguyen
Attorney, Agent, or Firm—Charles L. Warren

[57] ABSTRACT

Testing according to this invention allows functions of a first network which is accessible by other networks to be tested without requiring a separate simulator of the other network or interaction with the other networks. This capability is generally accomplished by utilizing a gateway node in the first network to loop-back a query originated in the first network so that it appears as though it originated from another network. The first network then processes the query and originates a reply to the query which is forwarded to the gateway node. Again, the gateway node loops back the reply to the node in the first network which originated the query. Receipt of the loopback reply at the first node provides an indication that the first network can properly respond to queries originated in another network corresponding to the test query.

16 Claims, 6 Drawing Sheets

METHOD AND APPARATUS FOR PERMITTING INTRANEWORK TESTING OF INTERNETWORK FUNCTIONS

BACKGROUND OF THE INVENTION

This invention generally addresses testing and verification in a communication system having separate, but connected, networks that are connected together. More specifically, it addresses the testing of one network's ability to respond to queries received from another network in a telecommunication system.

With the increasing trend towards fully integrated global communication networks, standards and compatibility between linked communication networks is an important concern. The facilities and implementation of features provided by networks often differ. Standard protocols have been established to facilitate the transmission of signaling and data between networks. However, these standards do not insure that facilities in a first communication network will interpret and respond to a query received from a second network in a manner anticipated by the second network.

Each network should be tested and validated in accordance with the standards to be followed by a communication system prior to connection to the other networks in the system. Isolating a problem in a communication system having a plurality of interconnected networks can be a difficult task. In many situations, it is difficult to determine which network is causing the problem. Even if general protocols and formats are followed, problems can arise because various implementations in hardware and software by the networks can result in the same query or message being handled differently by different networks. Dissimilar interpretations of a standard protocol can also result in problems.

To facilitate testing, various types of simulators have been utilized to emulate the actions of other networks. In a communications network, simulators may consist of a computer which has been programmed to emulate actions and responses that an external environment would provide to the network or module under test. Ideally, it would be impossible to distinguish the simulator from the network or module being simulated. However, complexity, and hence cost, of simulators increase geometrically with increasing complexity of the environment being simulated. Thus, simulators that emulate an entire network are very complex, costly, and difficult to develop.

As communication systems become more open and allow networks to access more facilities in other networks, the need for testing and problem identification becomes critical. In order to minimize initial problems and quickly solve problems discovered after connection of a network to the system, it is desirable to isolate the network from the system for testing. It is also desirable to utilize as much of the real hardware and software capability of the network under test as possible so that differences between a testing environment and real network operation of the network are minimized. Thus, a need exists for the capability to test a first network's ability to interact with other networks while utilizing as much of the first network's actual hardware and software as possible and to perform such testing without interaction with the other networks or the need for a separate simulator to emulate the other networks.

SUMMARY OF THE INVENTION

The present invention addresses this testing need and provides for testing of a first network's functions accessible by other networks without requiring a separate simulator of the other network or interaction with the other networks. It also allows the first network to conduct self-tests of such functions while the network is connected to the other networks, thereby permitting problems to be isolated without disrupting communications with the other networks or the use of special test support by the other networks.

In a method in accordance with an embodiment of the present invention, testing is provided for a first telecommunications network coupled to a second telecommunications network. A gateway node in the first network couples the first network to the second network. An origination node in the first network originates a test query having as a destination a second facility in the second network via the gateway node. Upon the gateway node identifying a received query as being a test query, a loopback query is created by modifying the test query. The loopback query has a destination address of a first facility node within the first network and has an origination address consistent with a query originated by the second network. The first facility node in the first network provides a capability complementary to the corresponding second facility in the second network. The loopback query is routed by the gateway node in the first network to the first facility node. Upon the first facility node receiving the loopback query, a reply message is generated which has the gateway node as at least part of its destination coding. Upon the gateway node receiving the reply message, a loopback reply message is created by modifying the reply message. The loopback reply message includes the origination node as at least part of its destination coding and has an origination address consistent with a reply message that would have been originated by the second facility node in the second network. The loopback message is routed by the gateway node to the origination node which monitors for receipt of the loopback reply message. Receipt of a proper loopback reply message provides an indication that the first network can properly process queries from, and generate replies to, the second network. This test is accomplished without interaction with the second network. The present invention further contemplates an apparatus for implementing the method in accordance with the embodiment of the present invention.

DETAILED DESCRIPTION

Environment of Illustrative Embodiment

The illustrative embodiment of the present invention is incorporated in a telecommunications network and addresses the problem of testing a network for proper handling of international credit card validation (ICCV) requests originating from another telecommunications network. To facilitate an understanding of the illustrative embodiment, background relating to such requests follows. It will be appreciated that the present invention is not limited to the illustrative embodiment.

Telecommunications networks of different countries differ in internal operation and functions. Standards such as those provided by the International Telegraph and Telephone Consultative Committee (CCITT) provide common protocols and formats for communications between such networks.

Data communications over an international telecommunications system is required to permit automated telephone charge card validation when a user's charge card issued in cooperation with a "foreign" network is sought to be used in another network, i.e., a telecommunications network which does not contain the data base needed to validate the user's telephone credit card. Upon the user initiating a telephone call in another network and indicating the desire to charge the call on his credit card either by voice communication with a local operator or by automatic data entry, the network will require verification that the user has a valid charge card number prior to allowing the requested call to be completed. The network originates a query including the user's telephone charge card number, personal identification number (PIN), and other routing information which is transmitted to the user's home network, i.e., the network containing a data base that can validate the user's charge card. The query ultimately arrives at the data base in the home network containing a list of valid PIN and telephone credit card numbers. The data base is checked and upon confirming that the user's PIN and charge numbers are valid, the data base originates a reply to the node in the requesting network that generated the query confirming validity. Upon the originating node receiving the reply indicating confirmation of a valid telephone charge card, the call is allowed to proceed.

Because of the differences in networks, especially those in other countries, and the number of variables which exist, when a communication problem occurs, it is often difficult to determine whether the problem exists in a foreign (remote) network or in the home network. Thus, it would be advantageous if at least one, and preferably both of the networks could independently test for proper operation in handling the query and the resulting reply. The illustrative embodiment of the present invention addresses such a testing capability.

Figure 1:
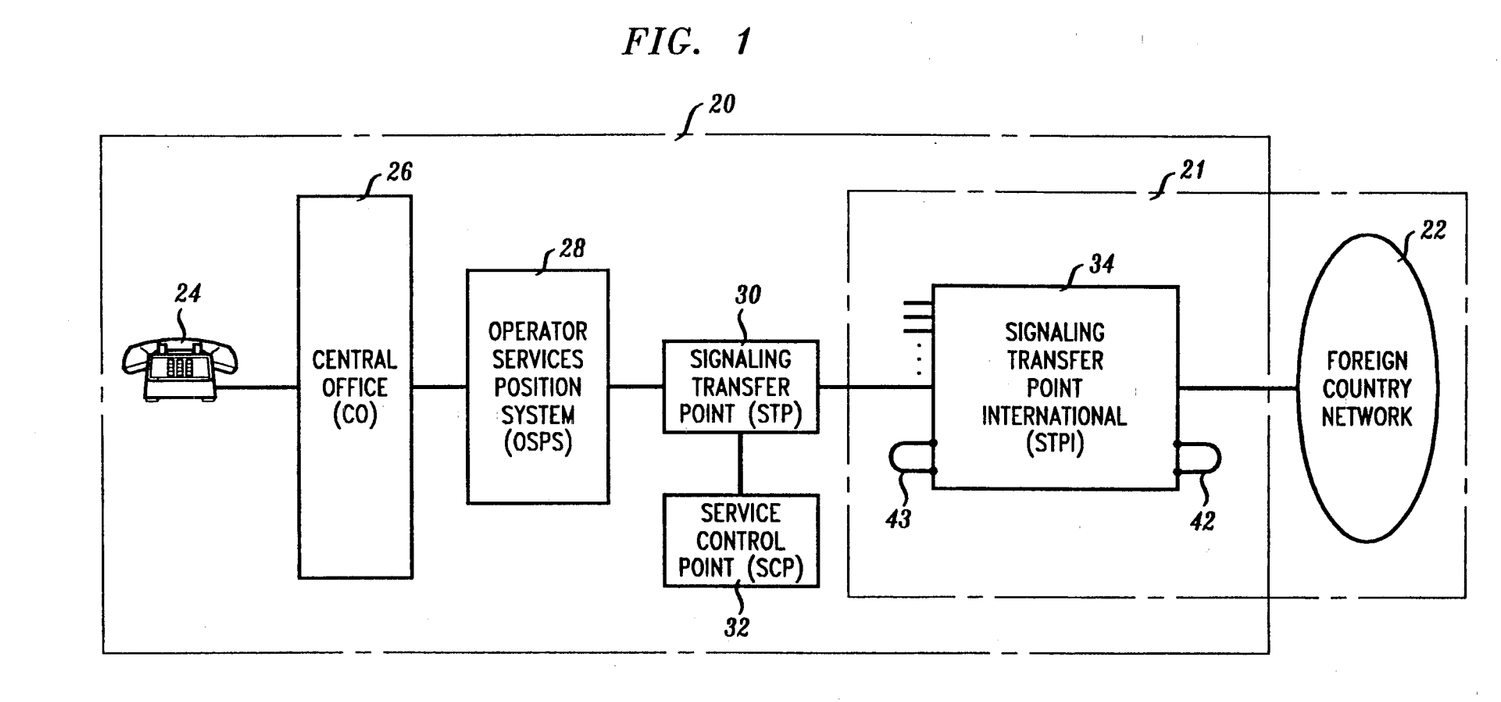
FIG. 1 is a block diagram of a telecommunications system including a communications network which incorporates an embodiment of the present invention.

FIG. 1 illustrates a telecommunications system which includes a communications network 20 in accord with the present invention and a foreign country communications network 22. Another network 21 consisting of network 22 and part of network 20 is discussed later as an alternative embodiment of the present invention. The exemplary network 20 includes customer premises equipment 24 such as a telephone which is connected to a central office (CO) 26 that provides local service to the equipment 24. An operator services position system (OSPS) 28 is coupled to and serves CO 26. The OSPS 28 provides operator assisted services to users as required. A signaling transfer point (STP) facility 30 is coupled to OSPS 28, service control point (SCP) facility 32 and signaling transfer point international (STPI) facility 34. The STP 30 functions as a routing node which facilitates communications and message handling between the connected facilities. The SCP includes a data base resource which can contain a variety of information. For example, the SCP in the illustrative embodiment includes PIN and credit card numbers of users associated with network 20 and maintains an indication of the validity of each credit card. The SCP 32 receives local credit card validation queries and ICCV queries. It originates a reply transmission indicating the validity or invalidity of the requested PIN and credit card number. The STPI 34 functions as the international gateway signaling node for network 20. The STPI 34 contains a data base enabling messages originating in network 20 that are bound for foreign country network 22 to be properly encoded for transmission to the foreign country network. A normal ICCV query received by STPI 34 from network 22 would be routed via STP 30 to SCP 32; a corresponding reply by SCP 32 would be routed via STP 30 to STPI 34 which would route it to network 22 for delivery to the node that originated the ICCV query. The illustrated "foreign country" network 22 represents at least one different communications network which may or may not be geographically separated from the location of network 20. Network 22 may also contain a plurality of different telecommunications networks, each connected to network 20.

The embodiment of the present invention is directed to testing in a telecommunications system of the transmission and processing of data messages, such as ICCV queries and replies thereto. In FIG. 1 the path coupling of equipment 24, CO 26, and OSPS 28 represent transmission paths for voice and data. The remainder of the communication paths illustrated in FIG. 1 represent data transmission. Thus, the voice transmission path for a user of equipment 24 to the end destination of the called party would constitute a voice connection path not totally shown in FIG. 1. For purposes of illustration, the data transmission system utilized in network 20 may comprise a known out-of-band signaling technique such as Signaling System No. 7. The OSPS 28 may comprise an AT&T 5ESS® switch with an OSPS application; the STP 30 may comprise an AT&T model 2 STP; the SCP 32 may comprise an AT&T model 1 NCP; the STPI 34 may comprise an AT&T 5ESS switch with an STPI application.

DETAILS OF ILLUSTRATIVE EMBODIMENT

Figure 2:
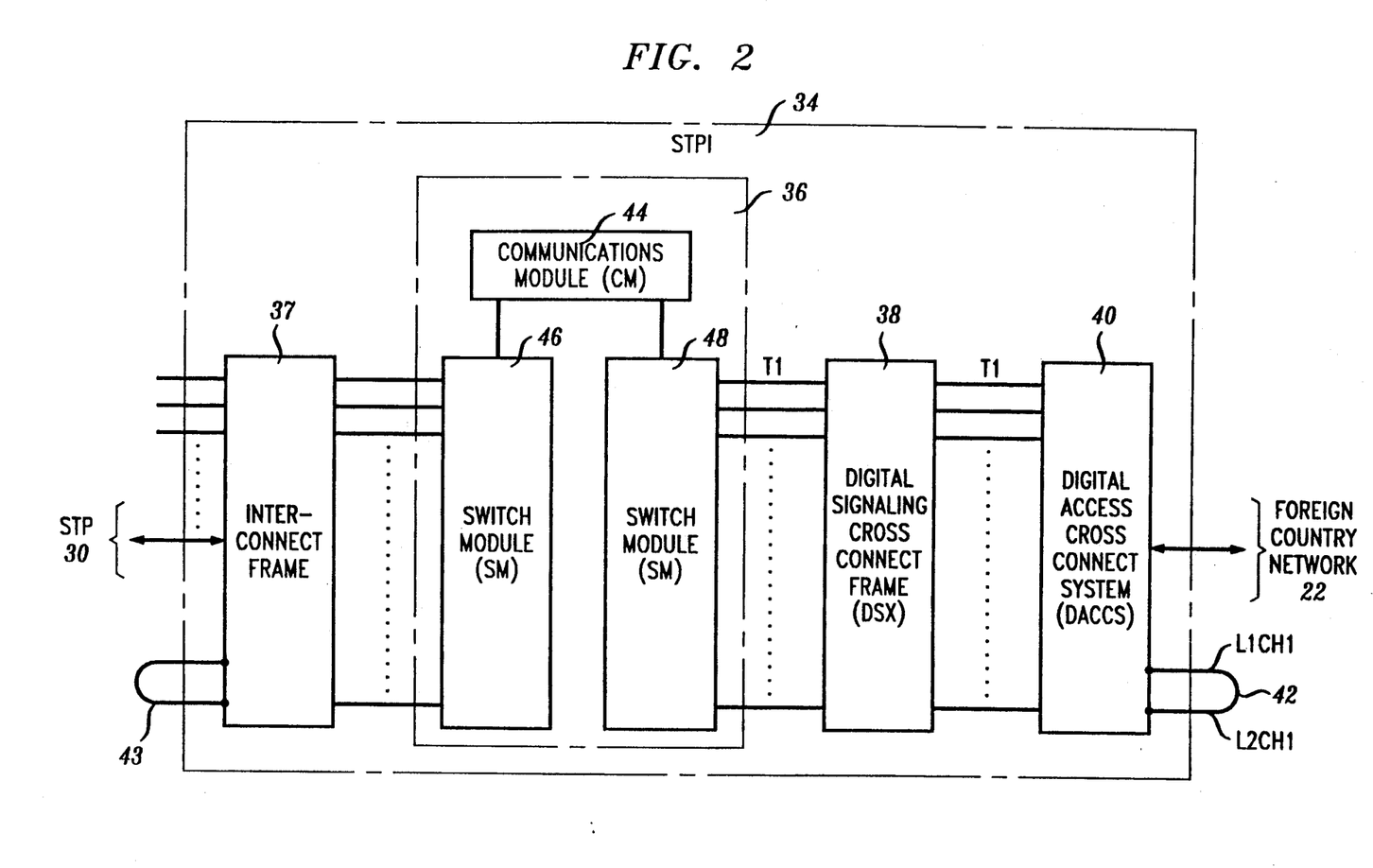
FIG. 2 is a block diagram illustrating a gateway node, the signaling transfer point international (STPI) of FIG. 1, in accordance with the present invention.

FIG. 2 illustrates that the STPI 34 includes a telecommunication switch 36 which is coupled to STP 30 via interconnect frame 37 and to digital signaling crossconnect frame (DSX) 38. The DSX 38 provides a physical interconnection structure permitting lines, such as T1 communication channels, to be connected between switch 36 and digital access crossconnect system (DACCS) 40. The DACCS 40 permits separate channels carried on the T1 lines to be selectively connected to channels carried by lines connected to foreign country network 22. The interconnect frame 37 which may consist of a DSX and DACCS provide the same channel connection capability to STP 30 and other nodes in network 20 for STPI 34. In the illustrative embodiment, switch 36 preferably consists of an AT&T 5ESS switch which contains a communications module (CM) which is coupled to switch modules (SM) 46 and 48. Switch 36 functions as an international gateway which couples signals from network 20 via SM 46 to the foreign country network 22 via SM 48. The communications module 44 in switch 36 facilitates communications between switch modules 46 and 48. International destined traffic received by SM 46 is routed by CM 44 to SM 48 for retransmission. Similarly, nationally bound traffic received from network 22 by international SM 48 is routed to SM 46 by CM 44.

A loop connection 42 is utilized in accordance with the present invention to connect channel 1 on T1 line L1 to channel 1 on T1 line L2. Thus, a signal transmitted from switch 36 over L1-CH1 or L2-CH1 is coupled to the other at DACCS 40 and returned to switch 36 on the other channel. A similar loopback capability is preferably provided for at least one pair of channels connected to SM 46. The interconnect frame 37 is used to couple one inbound channel of SM 46 to one outbound channel of SM 46 via loop connection 43. Thus, it is possible for switch 36 to transmit information via either SM 46 or 48 on a predetermined outbound channel and have that information received back at the transmitting SM on a predetermined inbound channel. This capability is utilized in accordance with the present invention and is described in further detail below.

Figure 3:
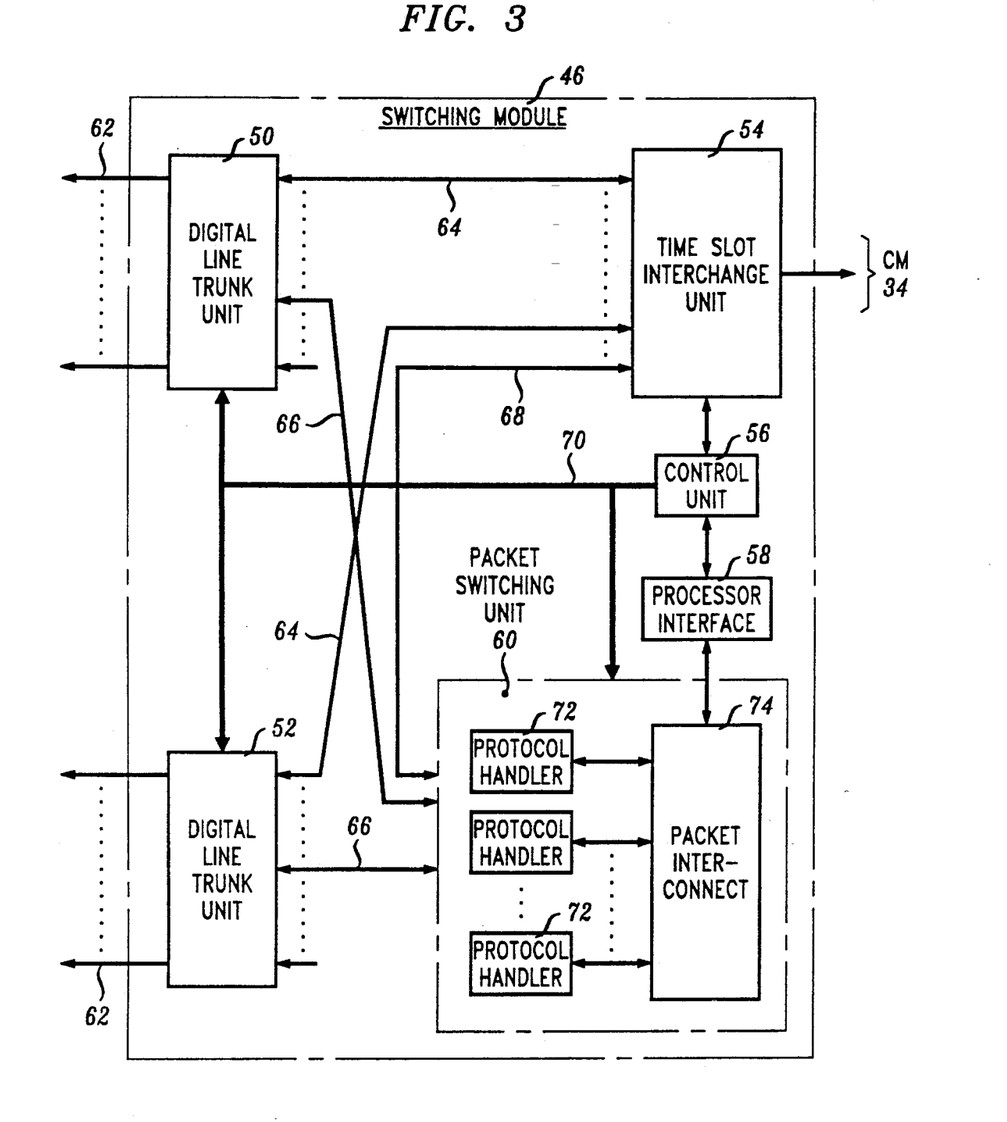
FIG. 3 is a block diagram of a switch module of FIG. 2 in accordance with the present invention.

FIG. 3 is a diagram of switching module 46 which is substantially identical to switching module 48. Switching modules such as used in the AT&T 5ESS switch are generally known and have been described in technical literature including *AT&T Technical Journal*, July-August, 1985, Vol. 64, No. 6, Part Two, and in U.S. Pat. No. 4,592,048 which is incorporated by reference herein.

Switching module 46 includes digital line trunk units 50 and 52, time slot interchange unit 54, control unit 56, processor interface 58, and packet switching unit 60. A plurality of communication lines 62 link digital line trunk units 50 and 52 via interconnect frame 37 (see FIG. 2) to other communication nodes including STP 30. The switching module 46 supports circuit-switched communication channels and packet communication channels. The circuit-switched communication channels are assigned for the duration of the transmission of information which can consist of digitized voice or data. Packet communication channels normally carry data, i.e., not voice. Data buses 64 couple circuit-switched information such as PCM encoded information between the digital line trunk units 50 and 52, and time slot interchange unit 54. Buses 66 couple packet data between the digital line trunk units and packet switching unit 60. A bus 68 couples packet switching unit 60 with time slot interchange unit 54. A bus 70 is used to transmit control information from control unit 56 to the digital line trunk units 50 and 52 and packet switching unit 60.

The packet switching unit 60 includes protocol handlers 72 each connected to packet interconnect 74. Each communication device coupled by one of lines 62 is associated with one of the protocol handlers 72. Each protocol handler receives packet data from its associated communication device, stores the data, and retransmits the stored packet through packet interconnect 74 towards its destination. When a packet communication is received on one of lines 62 which is destined for a communication device also connected to one of lines 62, the protocol handler 72 associated with the origination device receives the packet and transfers it via packet interconnect 74 to the protocol handler associated with the destination device. If the destination is to a device not associated with one of lines 62, the packet is transmitted from the packet switching unit 60 by bus 68 to time slot interchange unit 54 for further transmission and routing by CM 44.

A signaling packet is utilized to set up both circuit-switched and packet communication paths. Upon receiving a signaling packet, a protocol handler 72 transmits it via packet interconnect 74 to processor interface 58. The processor interface 58 transmits signaling packets to communication devices served by switching module 46 through packet interconnect 74 and protocol handlers 72. The control unit 56 controls the establishment of packet communication routes within switching module 46.

Figure 4:
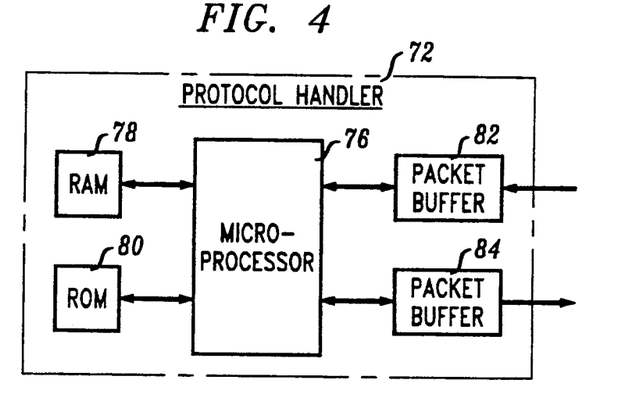
FIG. 4 is a block diagram of a protocol handler of FIG. 3 in accordance with the present invention.

FIG. 4 is a block diagram illustrating a protocol handler 72 which includes a microprocessor 76 with associated program instructions stored in read-only memory (ROM) 80 and random access memory (RAM) 78. A protocol handler is associated with each communication device served by one of lines 62. The function of the protocol handler is to receive, store and send the packet towards its destination. A packet buffer 82 receives and temporarily stores inbound data from an associated communications device. Upon decoding the destination of the packet from the packet header, the received packet is transferred to RAM 78. The packet information stored in RAM 78 is transferred to packet buffer 84 with an appropriate header for transmission in accordance with the destination contained in the corresponding received packet header. Packets are organized in different formats; one format which is utilized in explaining the exemplary embodiment of the present invention is described below.

Figure 5:
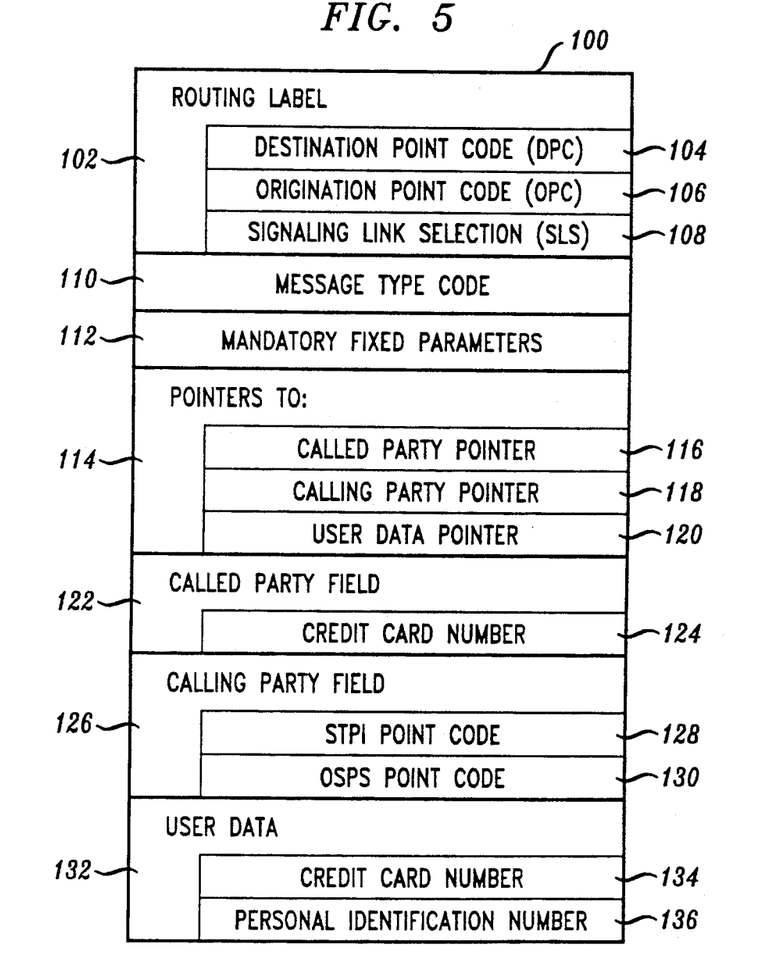
FIG. 5 is a message format for a signaling connection control part (SCCP) message utilized in accordance with the present invention.

FIG. 5 illustrates a message format 100 for an SCCP message utilized in the exemplary embodiment of the present invention to validate a telephone charge card. The SCCP message format 100 is defined in *CCITT*, Vol. VI, Fascicle VI.7, Recommendation Q.713. A routing label section 102 contains the information necessary to deliver the message to its destination point. This label contains a destination point code (DPC) 104 which indicates a destination node, an origination point code (OPC) 106 indicating the originating node of the message, and a signaling link selection (SLS) field 108 used to control load sharing. Since the destination defined by the DPC can normally be reached through more than one communication path, the SLS is utilized to control load sharing among the possible path choices. The message type code section 110 defines the function and format of different types of SCCP messages such as an ICCV query. The mandatory fixed parameter section 112 contains parameters uniquely defined by the message type. Pointer section 114 includes pointers used to identify parameters which follow in message 100. Each pointer is an address indicating the beginning of each parameter. Pointers in section 114 include called party pointer 116, calling party pointer 118, and user data pointer 120.

In the illustrative example, called party field 122 includes a credit card number field 124 which contains the user's credit card number. Calling party field section 126 includes STPI point code 128 (the node in network 20 calling network 22) and OSPS point code 130 (the originating node in network 20 of the test query). The STPI point code 128 is inserted into calling party field section 126 by the STPI prior to transmission. User data section 132 includes credit card number field 134 which, like field 124, holds the user's credit card number, and a personal identification number 136 assigned to each credit card user.

Handling of a Normal (Non-Test) ICCV Request

The specific fields and parameters indicated in FIG. 5 are utilized in the illustrative embodiment to generate a query in SCCP format at OSPS 28 seeking ICCV of a user's foreign issued credit card number from network 22. The query would be generated by the OSPS in response to the user seeking to place a credit card call utilizing a credit card not issued in association with the local network. The routing and handling of SCCP messages is generally known in accordance with American National Standards Institute (ANSI) and CCITT protocols and formats. Generally, the information contained in routing label section 102 is utilized to route the message to the next node on a path to the final destination. Thus, the DPC indicates the address of the next node to which the message is to be transmitted, the OPC represents the node transmitting the message and the SLS indicates any relevant load sharing information concerning the choice of routes. The STPI point code in field 128 identifies STPI 34 as the node to which a reply is to be sent to the data base facility in network 22. The OSPS point code in field 130 identifies the node in network 20 to receive the reply. Upon the query reaching the last destination in network 20, the international gateway sends the query to foreign network 22 utilizing established destination and formats used for the particular type of message. The data base facility in foreign network 22, upon receiving the ICCV query and determining in a local data base that the credit card and personal identification numbers associated with the query are valid, originates a reply message destined for the originating OSPS in network 20 via the international gateway STPI 34. The STP 30 would relay the reply from gateway 34 to the originating OSPS node 28. Upon receiving the reply message validating the ICCV request, the OSPS 28 allows the credit card call initiated by the user at CPE 24 to proceed.

Self-Testing in Accord with Present Invention

In accordance with an embodiment of the present invention, a test ICCV message can be originated at an OSPS within network 20 requesting validation of a PIN and credit card number issued in association with network 22. The test ICCV message specifies a predetermined STPI such as STPI 34 and includes a predetermined PIN and credit card number preferably within the range of credit card numbers issuable by foreign network 22. The SCP 32 includes a data base in which the PIN and test credit card numbers are stored as valid numbers. The illustrative test in accordance with the present invention proceeds as follows.

Referring to FIGS. 1 and 2, a test ICCV query in SCCP format is originated by OSPS 28 in order to test the operation of network 20 and its ability to process ICCV requests from network 22. The ICCV query includes a test PIN, credit card number, and the point code for OSPS 28 stored in the calling party field 126. The STPI point code, which identifies the international gateway as the destination in network 20 to receive the reply message, is inserted by the STPI 34 upon receipt of the ICCV query. The OSPS point code identifies the originating node as the destination within network 20 to receive the reply message. The DPC consists of the point code for STP 30, the OPC consists of the point code for the OSPS 28. This message is transmitted to STP 30 which resends the message to STPI 34 after inserting the STPI's point code for the DPC and its own point code for the OPC.

Referring to FIG. 2, the test message is received by SM 46 which recognizes the test credit card number as being a special number utilized for testing and substitutes the point code of a gateway node in foreign network 22 as the DPC and substitutes the point code of STPI 34 as the OPC. The message is then sent to the CM 44 which relays it to SM 48. A predetermined protocol handler 72 (see FIG. 3) of SM 48 that handles the test messages switches the OPC/DPC prior to transmission to DSX 38 such that the STPI point code is the DPC and the foreign gateway point code is the OPC. This message is transmitted on a predetermined line and channel, i.e., line 1, channel 1 via DSX 38 to DACCS 40.

Loop 42 couples the message received on line 1, channel 1 to line 2, channel 1 for retransmission back through DACCS 40 and DSX 38 to SM 48. This query which is received by SM 48 appears to be an ICCV request originated by foreign network 22 and is handled by switch 36 as such a request. SM 48 identifies the type of message as an ICCV query and identifies a routing path to the SCP 32. The message is transferred by CM 44 to SM 46 which transmits the query to STP 30. The STP recognizes the received request and forwards the message to SCP 32. Upon receipt, SCP 32 searches a locally contained data base to determine if the credit card and personal identification numbers contained in the ICCV message are valid. Upon locating the numbers and determining their validity, the SCP 32 originates a reply message indicating validation using the STPI 34 point code of network 20 for the DPC and the point code of SPC 32 for the OPC. STP 30 receives the reply message and forwards it to STPI 34.

Upon switch module 46 of STPI 34 receiving the reply message, the message would, under normal CCITT recommendations, be discarded since the reply message would contain a calling party field that includes STPI's own point code. This discarding procedure is followed since it would normally be deemed an error, i.e., it would be perceived as an attempt to call itself. Prior to initiating this test procedure, the STPI 34 will have been initialized to activate self-testing which includes a processing change causing it not to respond in the normal mode of discarding such a message. The protocol handler 72 (see FIG. 3) associated with the receipt of this message will recognize the STPI point code receipt and under the self-test initialization will not discard the message. The protocol handler substitutes a predetermined point code for the STPI's calling party point code. The reply message is then transmitted from SM 46 via CM 44 to SM 48 which recognizes the predetermined point code and identifies this as a test message which is to be transmitted on one of the predetermined lines and channels which is looped around by loop 42. Prior to transmitting the message, SM 48 switches the OPC/DPC so that the STPI's point code becomes the DPC and gateway of the foreign network's point code becomes the OPC. The message is transmitted by DSX 34 and DACCS 40 to loop 42 which routes the message back through DACCS 40 and DSX 38 to SM 48.

The received, looped around, reply appears to SM 48 to be a valid normal ICCV reply message from foreign network 22 in response to the previously sent query. Upon receiving the reply message, SM 48 identifies the end destination node as the OSPS from the calling party field 126 and generates an appropriate routing label to the OSPS. The message is transmitted by CM 44, SM 46, and STP 30 to OSPS 28. The looped back reply message validating the initial ICCV query is received by the OSPS thereby completing a successful self-test of network 20. It will be apparent that this test procedure utilizes the operational components of network 20 in processing the test query and reply with minimized changes to the network in order to verify its operation. Preferably, signaling system 7 which is generally known to those skilled in the art, is used to handle messages in network 20 including the illustrative ICCV queries and replies.

Flow Diagrams

Figure 6:
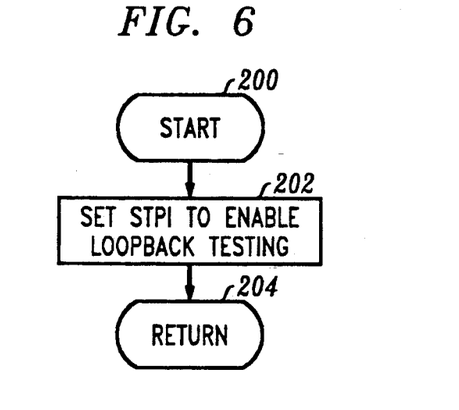
FIG. 6 is a flow diagram illustrating activation of an embodiment of the present invention.
Figure 7:
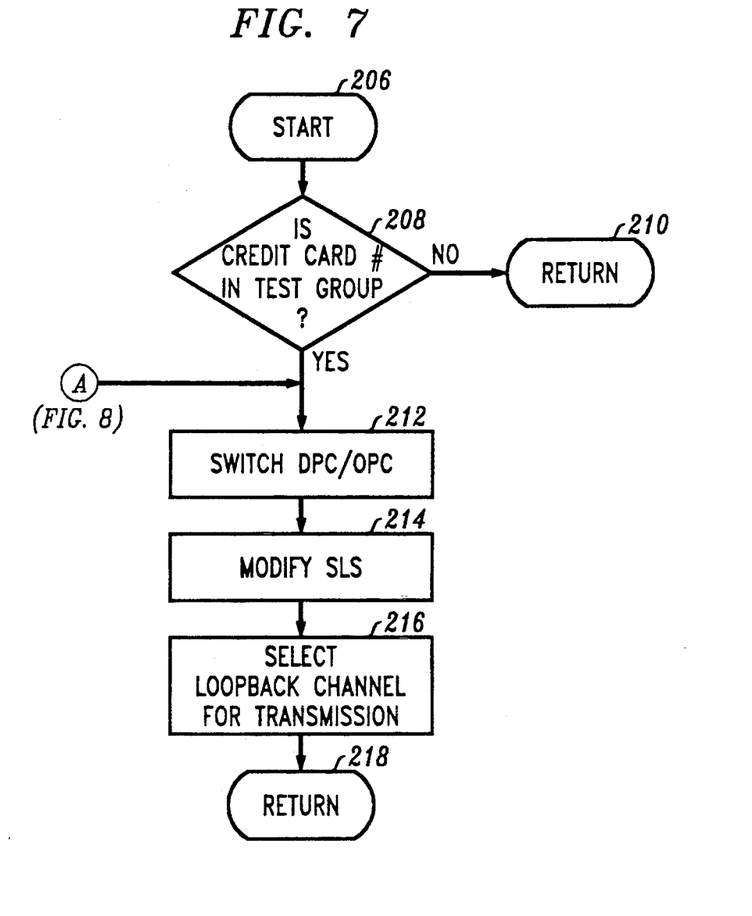
FIG. 7 is a flow diagram illustrating processing of an SCCP query in accordance with the present invention.
Figure 8:
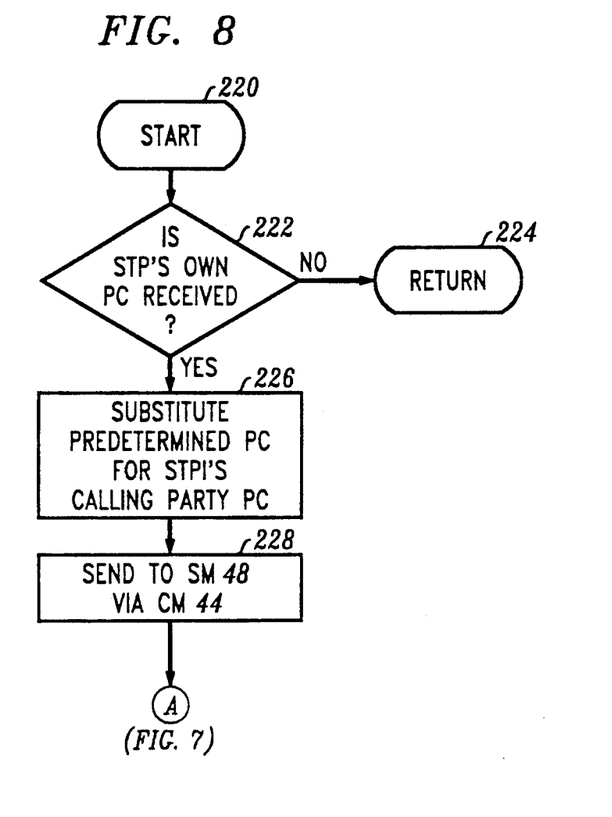
FIG. 8 is a flow diagram illustrating processing of a response to the SCCP message in accordance with the present invention.

The flow diagrams illustrated in FIGS. 6, 7, and 8 illustrate processes incorporated in STPI 34 in accordance with the present invention to accomplish the self-testing of network 20. Parameters within network 20 must be defined for proper operation of the testing method in accordance with the embodiment of the present invention. Predetermined charge card and personal identification numbers associated with the testing must be defined in the data base of SCP 32 and utilized in originating the test ICCV query at OSPS 28. A loopback path 42 or an equivalent mechanism must be utilized in order to route the outbound test query and the corresponding reply back to the gateway switch 36. The test procedure must be enabled at STPI 34 before receipt of the test query. The steps utilized by the STPI 34 to implement the self-test in accord with the illustrative embodiment are described below.

FIG. 6 is a flow diagram illustrating the activation of the exemplary testing features in STPI 34 in accordance with an embodiment of the present invention. In this flow diagram, the routine begins at START 200. In step 202, the STPI is set to enable loopback testing in accordance with the present invention. This may be accomplished by locally (manually) enabling the execution of procedures described in FIGS. 7 and 8, or may be enabled remotely by use of a signaling command. Following the initialization, this routine terminates at RETURN 204. These steps must be taken prior to receipt of a test query so that the STPI 34 can properly handle it. Preferably, the steps described relative to FIGS. 6-8 are implemented as software routines which interact with the conventional software that controls the normal operation of the STPI. The activation of FIG. 6 may comprise the loading and enablement of the programs of FIGS. 7 and 8, or the enablement of these programs if already loaded.

FIG. 7 is a flow diagram illustrating a series of steps performed by switch 36 to facilitate the processing of a test query in accordance with the illustrative embodiment of the present invention. Queries in network 20 bound for foreign network 22 are received by SM 46 and transmitted to SM 48 via CM 44. The steps illustrated in FIG. 7 are integrated within the normal query and message handling processing utilized by SM 48. Upon receiving a query from CM 44, SM 48 begins the steps at START 206. In step 208, a decision is made of whether the credit card number received as part of an ICCV query is a test number or within a predetermined range of test numbers. A NO decision results in termination of further steps at RETURN 210 which returns the control back to the normal processing of SM 48. Exiting via RETURN 210 would indicate that special processing in accordance with the test handling procedure of the embodiment of the present invention would not be utilized to process the query. A YES decision at step 208 indicates a test query has been received and causes a predetermined protocol handler 72 (FIG. 3) associated with handling the test query to switch the DPC and OPC at step 212. Next, in step 214 the SLS in the routing label is modified to be the same as an SLS which would have been received if the query had been received from foreign network 22. In step 216, the protocol handler causes the test query to be transmitted on one of the two communication channels associated with loopback path 42, i.e., line 1, channel 1 or line 2, channel 1, in order to have the test query, as modified by steps 212 and 214, be returned (looped back) to SM 48. These steps associated with handling of the outbound test query terminate at RETURN 218 which returns normal processing control to SM 48. The test query as modified in accordance with FIG. 7 is received by SM 48 on one of the two channels associated with loopback path 42.

The looped back test query received by SM 48 has the same protocol and format as if it had been originated by foreign country network 22 and hence, is processed in the normal manner by switch 36. As part of the normal processing, switch 36 determines the proper routing within network 20 of the looped back query in accordance with a locally associated data base which determines the appropriate SCP within the network 20 to receive the query. The SCP 32 receives the looped back test query and upon finding the charge card number and personal identification number as valid entries in its data base, generates a reply message in a normal manner. This reply is received by SM 46 after being routed through STP 30.

FIG. 8 is a flow diagram illustrating the processing of a reply message corresponding to the looped back test query. After switch 36 is initialized in accordance with FIG. 6, replies received by SM 46 are processed beginning at START 220. In decision step 222, a determination is made if the STPI's own point code is included in calling party field 126. A NO determination results in the conclusion of processing in accordance with FIG. 8 at RETURN 224 which returns control to normal processing. A YES determination by step 222 results in a substitution of a predetermined point code for the STPI point code contained in calling party field 126 by step 226. The predetermined point code substitution is utilized to identify a particular protocol handler 72 utilized by SM 48 to handle responses to test queries. Normally, pursuant to CCITT protocol, the STPI would discard a message which contained the STPI's point code in the calling party field as a disallowed condition (an error).

Following the point code substitution, the reply is sent to SM 48 via CM 44 by step 228. Processing of the reply continues by reentering steps previously described in FIG. 7 at point "A". As previously explained, the DPC and OPC must be switched and the SLS modified so that the looped back reply when received by SM 48 via loopback path 42 will appear in proper format.

Again, the loopback channel is selected for transmission of the modified reply. Special processing ends at RETURN 218. The modified reply is then handled by normal processing including its transmission by SM 48 on one of the loopback channels.

The looped back modified reply received by SM 48 appears as a reply originated by foreign network 22 in response to the initial test query generated by OSPS 28. Switch 36 processes the looped back modified reply in the normal way by routing it via STP 30 to OSPS 28. The successful receipt of a validation reply by OSPS 28 to the test query confirms that the elements in network 20 which are responsible for handling ICCV queries from and replies to foreign network 22 are functioning properly. Test queries can be originated manually or a series of such test queries can be generated under computer control at OSPS 28 to test network 20.

The test capacity provided in accordance with the present invention eliminates the requirement of a separate simulator which would simulate foreign network 22. In addition to sending single test queries for validation of network 20, a series of test queries can be generated to accomplish load testing of network 20 to simulate different traffic conditions.

Since switch 36 can function as a bidirectional switch, it will be apparent to those skilled in the art that test queries originated from foreign network 22 can be modified as per FIG. 7 by STPI 34, looped back by loop back path 43, and retransmitted back to foreign network 22 in order to test elements within network 22. This permits real time testing of network 21 utilizing real network elements within network 22 as well as testing communication links between networks 22 and 20 by the use of such test queries generated by network 22. Such testing of network 21 is facilitated by the loopback and self-test capabilities of international gateway STPI 34. These tests of network 21 do not require action by SCP 32 as would a normally handled ICCV query from network 22.

The present invention, although suited for network testing of an ICCV application, is not limited to this use. It is most useful for network testing where information must be communicated between different networks. For example, a public telephone network may be required to communicate with a private telecommunication network controlled by a corporation or with a different public network. Also, the specific type of messages to be communicated will vary depending on the functions and information involved. Examples, not to be considered exhaustive, of different internetwork messages include third party billing requests, feature availability requests that seek to determine if the other network supports a feature, and requests to determine if a "foreign" user or groups of such users are authorized to use specific features.

Although an embodiment of the present invention has been described and shown in the accompanying drawings, the scope of the invention is defined by the claims which follow.

I claim:

1. A method for testing a first telecommunications network coupled to a second telecommunications network comprising the steps of:
   a) originating at a first node in the first network a test query having a gateway node in the first network as at least part of its destination route;
   b) upon said gateway node receiving said test query, generating a loopback query based on said test query, said loopback query having a destination address of a facility node within the first network and an origination address consistent with a query originated by the second network;
   c) routing said loopback query to said facility node;
   d) generating a reply message in response to said facility node receiving said loopback query, said reply message having the gateway node as at least part of its destination route;
   e) upon receipt of said reply message by said gateway node, generating a loopback reply message based on said reply message, said loopback reply message having said first node as at least part of its destination route and an origination address consistent with a reply message originated by the second network;
   f) routing said loopback reply message to said first node;
   g) monitoring for receipt of said loopback message at said first node, receipt of said loopback message providing an indication that said first telecommunications network can process queries from, and generate replies to, the second network.

2. The method according to claim 1 wherein said reply message generating step further comprises the step of generating as part of said reply message a data portion containing information sought by said test query, whereby receipt of said data portion contained in said loopback reply message at said first node provides confirmation that said first network responded properly to said test query.

3. The method according to claim 1 further comprising the step of initializing said gateway node to monitor for said test query 4. The method according to claim 1 wherein the step of originating said test query includes the step of generating said test query with a predetermined parameter which said gateway node uses to identify said test query.

5. The method according to claim 1 wherein said originating step includes the step of originating said test query as a signaling connection control part message.

6. The method according to claim 1 wherein said originating step includes the step of originating said test query so that it contains a predetermined credit card number within a range of credit card numbersauthorized for use in association with the second network.

7. A first telecommunications network having an improved test capability coupled to a second telecommunications network, the first network comprising:
   means for originating at a first node in the first network a test query having a gateway node in the first network as at least part of its destination route;
   means for detecting receipt of said test query at the gateway node;
   means, responsive to receipt of said test query, for generating a loopback query based on said test query, said loopback query having a destination address of a facility node in said first network and an origination address consistent with a query originated by the second network;
   means for routing said loopback query to said facility node;
   means for generating a reply message in response to said facility node receiving said loopback query, said reply message having the gateway node as at least part of its destination route;

means responsive to receipt of said reply message at said gateway node for generating a loopback reply message based on said reply message, said loopback reply message having said first node as at least part of its destination route and an origination address consistent with a reply message originated by the second network;

means for routing said loopback reply message to said first node, receipt of said loopback message by said first node providing an indication that said first telecommunications network can properly process queries from and generate replies to the second network.

8. The first network according to claim 7 wherein said reply message generating means generates as part of said reply message a data portion containing information sought by said test query.

9. The first network according to claim 7 further comprising means for enabling and disabling said detecting means.

10. The first network according to claim 7 wherein said originating means generates said test query with a predetermined parameter which said monitoring means uses to identify said test query.

11. The first network according to claim 7 wherein said originating means originates said test query as a signaling connection control part message.

12. The first network according to claim 7 wherein said originating means originates said test query so that it contains a predetermined credit card number within a range of credit card numbers authorized for use in association with the second network.

13. A method utilized by a first telecommunications network coupled by a gateway node to a second telecommunications network comprising the steps of:
   a) monitoring for the arrival at the gateway node of a test query;
   b) upon detecting the arrival of said test query, generating a loopback query based on said test query, said loopback query having a destination address of a facility node in said first network;
   c) sending said loopback query towards its destination in the first network;
   d) monitoring for the arrival at the gateway node of a reply message responding to said loopback query;
   e) upon detection of said reply message at said gateway node, generating a loopback reply message based on said reply message, said loopback reply message having a predetermined node in the first network as at least part of its destination route;
   f) sending said loopback reply message towards its destination in the first network, thereby providing a method for generating loopback queries and loopback reply messages based on queries and reply messages, respectively, to facilitate self-testing of the first telecommunications network.

14. The method according to claim 13 further comprising the step of initializing said gateway node in order to activate monitoring for the arrival of test queries and reply messages.

15. A gateway node having an improved testing capability in a first telecommunications network coupled to a second telecommunications network via said gateway node comprising:
   means associated with said gateway node for detecting receipt of a test query;
   means for generating a loopback query based on the test query upon receipt of the test query at the gateway node, said loopback query having a destination address of a facility node in the first network;
   means for sending said loopback query towards its destination within the first network;
   means for detecting receipt of a reply message at the gateway node responding to said loopback query;
   means for generating a loopback reply message based on said reply message in response to receipt of the reply message at the gateway node, said loopback reply message having a predetermined node in the first network as at least part of its destination route;
   means for sending said loopback reply message towards its destination in the first network, thereby providing a self-test facility in the first network independent of interaction with the second network.

16. The gateway node according to claim 15 further comprising means for initializing the gateway node to activate said test query and reply message detecting means.

* * * * *